United States Patent [19]
Richter et al.

[11] 3,860,643
[45] Jan. 14, 1975

[54] COMPOSITIONS OF MATTER

[75] Inventors: Sidney B. Richter, Chicago; John Krenzer, Oak Park, both of Ill.

[73] Assignee: Velsical Chemical Corporation, Chicago, Ill.

[22] Filed: Aug. 15, 1968

[21] Appl. No.: 752,797

[52] U.S. Cl. .............................. 260/545 R, 71/115
[51] Int. Cl. .......................................... C07c 127/22
[58] Field of Search ................................... 260/545

[56] References Cited
UNITED STATES PATENTS
3,671,586   6/1972   Fischer et al. ................. 260/545 R FOREIGN PATENTS OR APPLICATIONS
184,062    7/1966   U.S.S.R. .............................. 260/545
1,060,135  3/1967   Great Britain ...................... 260/472
182,729    6/1966   U.S.S.R. .............................. 260/545

*Primary Examiner*—Robert Gerstl
*Attorney, Agent, or Firm*—Robert J. Schwarz; Dietmar H. Olesch

[57] ABSTRACT

New compounds of the formula

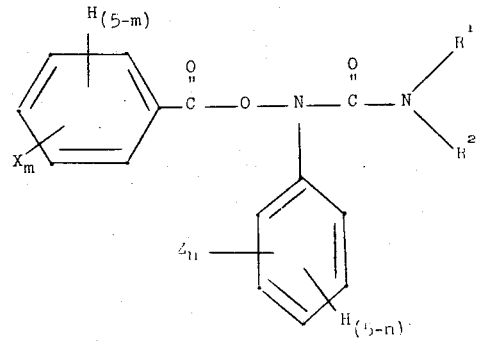

wherein X and Z are independently selected from the group consisting of alkyl, alkenyl, halogen, haloalkyl, alkoxy, nitro and dialkylamino; m and n are integers from 0 to 5; and $R^1$ and $R^2$ are independently selected from the group consisting of hydrogen and alkyl. A herbicidal composition comprising an inert carrier and, as an essential active ingredient, in a quantity toxic to weeds a compound described above. A method for the control of weeds which comprises applying to the locus of said weeds a herbicidal composition comprising an inert carrier and, as an essential active ingredient, in a quantity toxic to weeds, a compound as described above.

4 Claims, No Drawings

COMPOSITIONS OF MATTER

This invention relates to new compositions of matter and more particularly relates to new chemical compounds of the formula:

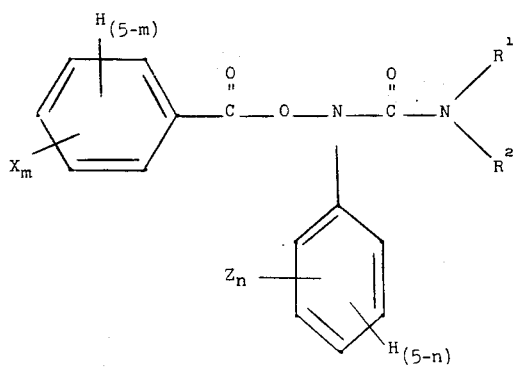

wherein X and Z are independently selected from the group consisting of alkyl, alkenyl, halogen, haloalkyl, alkoxy, nitro and dialkylamino; $m$ and $n$ are integers from 0 to 5; and $R^1$ and $R^2$ are independently selected from the group consisting of hydrogen and alkyl.

In a preferred embodiment of this invention the substituents X and Z are independently selected from the group consisting of lower alkyl, lower alkenyl, lower haloalkyl, chlorine bromine, lower alkoxy, nitro, and di(lower alkyl) amino; $m$ and $n$ are integers from 0 to 3; and $R^1$ and $R^2$ are independently selected from the group consisting of hydrogen and lower alkyl. The term lower as used herein designates a straight or branched carbon chain of up to 10 carbon atoms.

The compounds of the present invention are unexpectedly useful as herbicides.

The new compounds of the present invention can be prepared readily by reacting a hydroxyurea of the formula

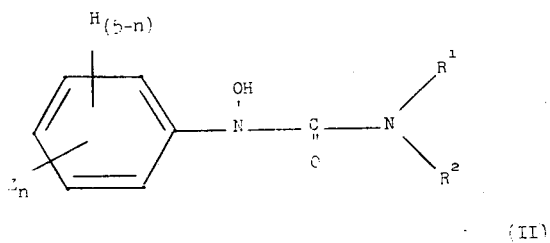

wherein Z, $R^1$, $R^2$ and $n$ are as hereinabove described, with a benzoyl halide of the formula:

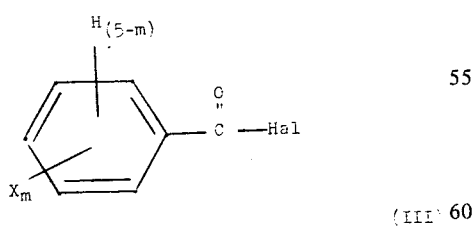

wherein Hal designates halogen such as chlorine or bromine, and X and m are as heretofore described. This reaction can be conveniently effected by adding an equimolar or slight excess molar amount of a compound of Formula III to the hydroxyurea of Formula II in a suitable inert organic reaction medium in the presence of an acid scavenger such as a tertiary amine, at a temperature of from about 0° C. to about 50° C. The reaction mixture can then be stirred for a period of from about ½ to about 4 hours to ensure the completion of the reaction. Thereafter the desired product can be recovered by filtration if the product remains in solution or by other procedure common to the art. The recovered product can then be used as such or can be further purified by washing, recrystallizing and the like.

Exemplary suitable hydroxyureas for the purpose of preparing the compounds of this invention are: 1-hydroxy-1-phenylurea, 1-hydroxy-1-phenyl-3-methylurea, 1-hydroxy-1-phenyl- 3,3-dimethylurea, 1-hydroxy-1-(2'-methylphenyl) -3-methylurea, 1-hydroxy-1-(3'-chlorophenyl)-3-methylurea, 1-hydroxy-1-(3',4'-dichlorophenyl)-3-methylurea, 1-hydroxy-1-(4'-bromophenyl) -3,3-dimethylurea, 1-hydroxy-1-(4'-allylphenyl)-3-ethylurea, 1-hydroxy-1-(2'-methoxyphenyl)-3-isopropylurea, 1-hydroxy-1-(3'-nitrophenyl)-3-methylurea, 1-hydroxy-1-(2'-dimethylaminophenyl)-3-methylurea, 1-hydroxy-1-(2'-methyl-4'-chlorophenyl)-3,3-dimethylurea, 1-hydroxy-1-(3',4',5'-trichlorophenyl)13,3-diethylurea, and 1-hydroxy-1-(4'-chlorophenyl)-3-methyl-3-t-butylurea.

Exemplary suitable benzoyl halides for preparing the compounds of the present invention are: benzoyl chloride, 2-methylbenzoyl chloride, 3-methylbenzoyl chloride, 4-methylbenzoyl chloride, 2-chlorobenzoyl chloride, 3-chlorobenzoyl chloride, 4-chlorobenzoyl chloride, 3,4-dichlorobenzoyl chloride, 2,4,5-trichlorobenzoyl chloride, 2-methyl-4-chlorobenzoyl chloride, 4-methoxybenzoyl chloride, 2-methoxy-3,6-dichlorobenzoyl chloride, 3,4-dibromobenzoyl chloride, 4-nitrobenzoyl chloride, 2-methyl-4-nitrobenzoyl chloride, 2-dimethylaminobenzoyl chloride, 2-dimethylamino-5-chlorobenzoyl chloride, 3-trifluoromethylbenzoyl chloride and 3-allylbenzoyl chloride.

The manner in which the compounds of the present invention can be prepared readily is further illustrated in the following examples:

EXAMPLE 1

Preparation of 1-Phenylcarbonyloxy-1--(,4'-dichlorophenyl)-3-methylurea

A solution of 1-hydroxy-1-(3',4'-dichlorophenyl)-3-methylurea (6 grams; 0.025 mol) in diethylether (300 ml) and triethylamine (3.8 ml) were charged into a glass reaction vessel equipped with a mechanical stirrer. The mixture was cooled to about 5° C. and benzoyl chloride (3.8 grams; 0.027 mol) was slowly added. After the addition was completed, the reaction mixture was stirred for a period of about 1 hour. After this time, the reaction mixture was filtered and the filtrate was stripped of solvent to yield a solid residue. The residue was then washed with pentane and dried to yield 1-phenylcarbonyloxy-1-(3',4'-dichlorophenyl)-3-methylurea having a melting point of 105° to 107° C. and having the following elemental analysis as calculated for $C_{15}H_{12}Cl_2N_2O_3$:

|  | C | H | N |
| --- | --- | --- | --- |
| Theoretical % | 53.16 | 3.57 | 8.26 |
| Found % | 53.47 | 3.58 | 8.25 |

EXAMPLE 2

Preparation of 1-(2'-Methylphenylcarbonyloxy)-1-(3'',4''-dichlorophenyl)-3-methylurea A solution of 1-hydroxy-1-(3',4'-dichlorophenyl)-3-methylurea (6 grams; 0.025 mol) in benzene (100 ml.)

and triethylamine (3.8 ml) were charged into a glass reaction vessel equipped with a mechanical stirrer. Ortho-toluyl chloride (4.5 grams; 0.026 mol) was added to the reaction vessel and the resulting reaction mixture was stirred for a period of about one-half hour at room temperature. After this time, the reaction mixture was warmed and filtered to remove the triethylamine hydrochloride which had formed. The filtered solution was then cooled resulting in crystallization of the reaction product. The product was recovered by filtration, was washed with pentane and was dried to yield 1-(2'-methylphenylcarbonyloxy)-1-(3'',4''-dichlorophenyl)-3-methylurea having a melting point of 116° to 117° C and having the following elemental analysis as calculated for $C_{16}H_{14}Cl_2N_2O_3$:

|  | C | H | N |
|---|---|---|---|
| Theoretical % | 54.33 | 4.00 | 7.94 |
| Found % | 54.68 | 4.03 | 7.87 |

EXAMPLE 3

Preparation of 1-(3'-Methoxyphenylcarbonyloxy)-1-(3'',4''-dichlorophenyl)-3-methylurea A solution of 1-hydroxy-1-(3',4'-dichlorophenyl)-3-methylurea (6 grams; 0.026 mol) in benzene (150 ml), and triethylamine (3.8 ml) were charged into a glass reaction vessel equipped with a mechanical stirrer. 3-Methoxybenzoyl chloride (4.4 grams; 0.025 mol) was added to the reaction vessel and the resulting reaction mixture was stirred for a period of about 30 minutes. The reaction mixture was then filtered and the filtrate stripped of solvent to yield a solid product. The product was washed with pentane and dried under vacuum to yield 1-(3'-methoxyphenylcarbonyloxy)-1-(3'',4''-dichlorophenyl)-3-methylurea having a melting point of 128° to 129° C. and having the following elemental analysis as calculated for $C_{16}H_{14}Cl_2N_2O_4$:

|  | C | H | N |
|---|---|---|---|
| Theoretical % | 52.07 | 3.82 | 7.59 |
| Found % | 52.12 | 4.13 | 7.57 |

EXAMPLE 4

Preparation of 1-(2',3',6'-trichlorophenylcarbonyloxy)-1-(3'',4''-dichlorophenyl)-3-methylurea A solution of 1-hydroxy-1-(3',4'-dichlorophenyl)-3-methylurea (5.2 grams; 0.02 mol) in benzene (150 ml), and triethylamine (3.0 ml) were charged into a glass reaction vessel equipped with a mechanical stirrer. 2,3,6-Trichlorobenzoyl chloride (5.2 grams; 0.02 mol) was added to the reaction vessel and the resulting mixture was stirred for a period of about one-half hour. The reaction mixture was then filtered and the filtrate stripped of solvent to yield a solid product. The product was washed with pentane and dried under vaccum to yield 1-(2',3',6'-trichlorophenylcarbonyloxy)-1-(3'',4''-dichlorophenyl)-3-methylurea having a melting point of 210° to 211° C and having the following elemental analysis as calculated for $C_{15}H_9Cl_5N_2O_3$:

|  | C | H | N |
|---|---|---|---|
| Theoretical % | 40.73 | 2.05 | 6.35 |
| Found % | 40.55 | 2.00 | 6.14 |

EXAMPLE 5

Preparation of 1-Phenylcarbonyloxy-1-(3'-nitrophenyl)-3-methylurea

A solution of 1-hydroxy-1-(3'-nitrophenyl)-3-methylurea (5 grams; 0.023 mol) in benzene (100 ml), and triethylamine (3.5 ml) were charged into a glass reaction vessel equipped with a mechanical stirrer. Benzoyl chloride (3.4 grams; 0.025 mol) was added to the reaction vessel and the resulting mixture was stirred for a period of about one-half hour. The reaction mixture was then filtered and the filtrate was stripped of solvent resulting in a solid product. The product was washed with pentane and dried under vacuum to yield 1-phenylcarbonyloxy-1-(3'-nitrophenyl)-3-methylurea having a melting point of 125° to 126° C and having the following elemental analysis as calculated for $C_{15}H_{13}N_3O_5$:

|  | C | H | N |
|---|---|---|---|
| Theoretical % | 57.21 | 4.16 | 13.32 |
| Found % | 57.08 | 4.85 | 13.17 |

Other compounds within the scope of this invention can be prepared by the procedures described in the foregoing examples. Presented in the following examples are the essential ingredients required to prepare the indicated named compounds according to the procedures heretofore described.

EXAMPLE 6

1-Hydroxy-1-(3',4'-dichlorophenyl)-3-methylurea + 4-chlorobenzoyl chloride + triethylamine = 1-(4'-chlorophenylcarbonyloxy)-1-(3'',4''-dichlorophenyl)-3-methylurea (m.p. 129° to 130° C).

EXAMPLE 7

1-Hydroxy-1-(3',4'-dichlorophenyl)-3-methylurea + m-toluyl chloride + triethylamine = 1-(3'-methylphenylcarbonyloxy)-1-(3'',4''-dichlorophenyl)-3-methylurea (m.p. 118° to 119° C).

EXAMPLE 8

1-Hydroxy-1-(3',4'-dichlorophenyl)-3-methylurea + 4-methyoxybenzoyl chloride + triethylamine = -(4'-methoxyphenylcarbonyloxy)-1-(3'',4''-dichlorophenyl)-3-methylurea (m.p. 145° to 147° C).

EXAMPLE 9

1-Hydroxy-1-(4'-chlorophenyl)-3-methylurea + 3-chlorobenzoyl chloride + triethylamine = 1-(3'-chlorophenylcarbonyloxy)-1-(4''-chlorophenyl)-3-methylurea (m.p. 178° to 180° C).

EXAMPLE 10

1-Hydroxy-1-(3'-chlorophenyl)-3-methylurea + p-toluyl chloride + triethylamine = 1-(4'-methylphenylcarbonyloxy)-1-(3''-chlorophenyl)-3-methylurea (m.p. 111° to 112° C).

EXAMPLE 11

1-Hydroxy-1-(3'-chlorophenyl)-3-methylurea + 4- chlorobenzoyl chloride + triethylamine = 1-(4'-chlorophenylcarbonyloxy)-1-(3''-chlorophenyl)-3-methylurea (m.p. 139° to 140° C).

EXAMPLE 12

1-Hydroxy-1-(3',4'4'-dichlorophenyl)-3-methylurea + 2-methoxy-3,6-dichlorobenzoyl chloride + triethylamine = 1-(2'-methoxy-3',6'-dichlorophenylcarbonyloxy)-1-(3'',4''-dichlorophenyl)-3-methylurea (m.p. 112° to 114° C).

EXAMPLE 13

1-Hydroxy-1-(3',4'-dichlorophenyl)-3-methylurea + 2-chlorobenzoyl chloride + triethylamine = 1-(2'-chlorophenylcarbonyloxy)-1-(3'',4''-dichlorophenyl)-3-methylurea (m.p. 104° to 105° C).

EXAMPLE 14

1-Hydroxy-1-(3',4'-dichlorophenyl)-3methylurea + p-toluyl chloride + triethylamine = 1-(4-methylphenylcarbonyloxy)-1-(3'',4''-dichlorophenyl)-3-methylurea (m.p. 130° to 131° C).

EXAMPLE 15

1-Hydroxy-1-phenyl-3-methylurea + p-toluyl chloride + triethylamine = (4'-methylphenylcarbonyloxy)-1-phenyl-3-methylurea (m.p. 108° to 110° C).

EXAMPLE 16

1-Hydroxy-1-(3',4'-dichlorophenyl)-3-methylurea + 3-chlorobenzoyl chloride + triethylamine = 1-(3'-chlorophenylcarbonyloxy)-1-(3'',4''-dichlorophenyl)-3-methylurea (m.p. 93° to 95° C).

EXAMPLE 17

1-Hydroxy-1-(3'-chlorophenyl)-3-methylurea + 2,3,6,-trichlorobenzoyl chloride + triethylamine = 1-(2',3',6'-trichlorophenylcarbonyloxy)-1-(3''-chlorophenyl)-3-methylurea (m.p. 199° to 200° C).

EXAMPLE 18

1-Hydroxy-1-phenyl-3-methylurea + 2,3,6-trichlorobenzoyl chloride + triethylamine = 1-(2',3',6'-trichlorophenylcarbonyloxy)-1-phenyl-3-methylurea (m.p. 192° to 193° C).

EXAMPLE 19

1-Hydroxy-1-(2',4',5'-trichlorophenyl)-3-methylurea + benzoyl chloride + triethylamine = 1-phenylcarbonyloxy-1-(2',4',5'-trichlorophenyl)-3-methylures (m.p. 135° to 138° C).

EXAMPLE 20

1-Hydroxy-1-(4'-methylphenyl)-3-methylurea + 2',3',6'-trichlorobenzoyl chloride + triethylamine = 1(-2',3',6'-trichlorophenylcarbonyloxy)-1-(4'-methylphenyl)-3-methylurea (m.p. 200° to 202° C).

EXAMPLE 21

1-Hydroxy-1-(4'-methylphenyl)-3-methylurea + 3-chlorobenzoyl chloride + triethylamine = 1-(3'-chlorophenylcarbonyloxy)-1-(4''-methylphenyl)-3-methylurea (m.p. 175° to 176° C).

EXAMPLE 22

1-Hydroxy-1-(4'-bromophenyl)-3,3-dimethylurea + 3-trifluoromethylbenzoyl chloride + triethylamine = 1(3'-trifluoromethylphenylcarbonyloxy)-1-(4''-bromophenyl)-3,3-dimethylurea.

EXAMPLE 23

1-hydroxy-1-(3'-allylphenyl)-3-isopropylurea + 4-dimethylaminobenzoyl chloride + triethylamine = 1-(4'-dimethylaminophenylcarbonyloxy)-1-(3''-allylphenyl)-3-isopropylurea.

EXAMPLE 24

1-Hydroxy-1-(3'-chlorophenyl)-3-methylurea + 3-chlorobenzoyl chloride + triethylamine = 1-(3'-chlorophenylcarbonyloxy)-1-(3''-chlorophenyl)-3-methylurea (m.p. 93° to 95° C).

EXAMPLE 25

1-Hydroxy-1-(2',4',5'-trichlorophenyl)-3-methylurea + 3-chlorobenzoyl chloride + triethylamine = 1-(3'-chlorophenylcarbonyloxy)-1-(2'',4'',5''-trichlorophenyl)-3-methylurea (m.p. 124° to 125° C).

EXAMPLE 26

1-Hydroxy-1-(3'-chlorophenyl)-3-methylurea + 2-methoxy-3,6-dichlorobenzoyl chloride + triethylamine = 1-(2'-methoxy-3',6'-dichlorophenylcarbonyloxy)-1-(3''-chlorophenyl)-3-methylurea (m.p. 113° to 114° C).

EXAMPLE 27

1-Hydroxy-1-(3'-bromophenyl)-3-methylurea + 3-chlorobenzoyl chloride + triethylamine = 1-(3'-chlorophenylcarbonyloxy)-1-(3''-bromophenyl)-3-methylurea (m.p. 90° to 92° C).

EXAMPLE 28

1-Hydroxy-1-(3'-chlorophenyl)-3-methylurea + 3-bromobenzoyl chloride = triethylamine = 1-(3'-bromophenycarbonyloxy)-1-(3''-chlorophenyl)-3-methylurea (m.p. 95° to 97° C).

EXAMPLE 29

1-Hydroxy-1-(3',4'-dichlorophenyl)-3-methylurea + 3-bromobenzoyl chloride + triethylamine = 1-(3'-bromophenylcarbonyloxy)-1-(3'',4''-dichlorophenyl)-3-methylurea (m.p. 101° to 102° C).

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculties, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

Example 30
Preparation of a Dust

| | |
|---|---|
| Product of Example 1 | 10 |
| Powdered Talc | 90 |

The above ingredients are mixed in a mechanical grinder-blender and are ground until a homogeneous, freeflowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5 to about 95 percent of the active ingredients in the herbicidal compositions. Use of combinations of these other herbicides and/or defoliants, dessicants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPA, 4-CPP, 2,4,5-TB, 2,4,5-TES, 3,4-DA, silvex and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate and the like; substituted urea herbicides such as norea, siduron, dichloral urea, chloroxuron, cycluron, fenuron, monuron, monuron TCA, diuron, linuron, monolinuron, neburon, buturon, trimeturon and the like; symmetrical triazine herbicides such as simazine, chlorazine, atratone, desmetryne, norazine, ipazine, prometryn, atrazine, trietazine, simetone, prometone, propazine, ametryne, and the like; chloroacetamide herbicides such as alpha-chloro-N,N-dimethylacetamide, CDEA, CDAA, alpha-chloro-N-isopropylacetamide, 2-chloro-N-isopropylacetanilide, 4-(chloroacetyl)morpholine, 1-(chloroacetyl)-piperdine, and the like; chlorinated alphatic acid herbicides such as TCA, dalapon, 2,3-dichloropropionic acid, 2,2,3-TPA and the like; chlorinated benzoic acid and phenylacetic acid herbicides such as 2,3,6-–TBA, 2,3,5,6,–TBA, dicamba, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4-dichloro-3-nitrobenzoic acid and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dircyl, merphos, DMPA, O-S-dimethyl tetrachlorothioterephathalate, methyl 2,3,5,6-tetrachloro-N-methoxy-N-methylterephathalamate, 2-[(4-chloro-o-tolyl)-oxy]-N-methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calcium cyanamid, DEF, ethyl xanthogen disulfide, sindone, sindone B, propanil and the like.

Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, furmitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and postemergence testing.

The herbicidal activity of the compounds of this invention was demonstrated by experiments carried out for the pre-emergence control of mustard weed. In these experiments small plastic greenhouse pots filled with dry soil were seeded with mustard weed. Twenty four hours or less after seeding the pots were sprayed with water until the soil was wet and the test compounds formulated as aqueous emulsions of acetone solutions containing emulsifiers were sprayed at the indicated concentrations on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0 = no injury, 1,2 = slight injury, 3,4 = moderate injury, 5,6 = moderately severe injury 7,8,9 = severe injury and 10 = death. The effectiveness of these compounds is demonstrated by the following data presented in Table I.

TABLE I

| Test Compound | Concentration lbs per acre | Injury Rating |
|---|---|---|
| Product of Example 1 | 2 | 10 |
| Product of Example 2 | 4 | 10 |
| do. | 8 | 10 |
| Product of Example 3 | 4 | 10 |

TABLE I-Continued

| Test Compound | Concentration lbs per acre | Injury Rating |
|---|---|---|
| do. | 8 | 10 |
| Product of Example 6 | 2 | 10 |
| do. | 4 | 10 |
| Product of Example 7 | 2 | 10 |
| do. | 4 | 10 |
| do. | 8 | 9 |
| Product of Example 8 | 1 | 9 |
| do. | 2 | 10 |
| do. | 4 | 10 |
| do. | 8 | 10 |
| Product of Example 10 | 2 | 10 |
| do. | 4 | 10 |
| do. | 8 | 10 |
| Product of Example 11 | 2 | 9 |
| do. | 4 | 10 |
| do. | 8 | 10 |
| Product of Example 12 | 2 | 8 |
| Product of Example 15 | 1 | 7 |
| do. | 2 | 7 |
| do. | 4 | 8 |
| do. | 8 | 10 |

The activity of the compound of this invention for the pre-emergence control of pigweed was demonstrated in experiments similar to those detailed above wherein pigweed was substituted for mustard weed. The results of these experiments are presented in Table II.

TABLE II

| Test Compound | Concentration lbs. per acre | Injury Rating |
|---|---|---|
| Product of Example 2 | 8 | 7 |
| Product of Example 3 | 4 | 10 |
| do. | 8 | 10 |
| Product of Example 6 | 4 | 9 |
| do. | 8 | 10 |
| Product of Example 7 | 8 | 8 |
| Product of Example 8 | 4 | 9 |
| do. | 8 | 10 |
| Product of Example 10 | 8 | 10 |
| Product of Example 11 | 8 | 9 |
| Product of Example 12 | 8 | 9 |
| Product of Example 15 | 4 | 9 |
| do. | 8 | 10 |

The activity of the compounds of this invention for the pre-emergence control of curly dock was demonstrated in experiments similar to those detailed above wherein curly dock was substituted for mustard weed.

The results of these experiments are presented in Table III.

TABLE III

| Test Compound | Concentration lbs. per acre | Injury Rating |
|---|---|---|
| Product of Example 1 | 2 | 8 |
| Product of Example 2 | 8 | 9 |
| Product of Example 3 | 4 | 8 |
| do. | 8 | 10 |
| Product of Example 6 | 4 | 10 |
| Product of Example 7 | 8 | 8 |
| Product of Example 8 | 8 | 10 |
| Product of Example 10 | 4 | 7 |
| do. | 8 | 8 |
| Product of Example 11 | 4 | 9 |
| do. | 8 | 10 |
| Product of Example 12 | 2 | 9 |
| Product of EXAMPLE 13 | 4 | 9 |
| Product of Example 15 | 8 | 7 |

The herbicidal activity of the compounds of this invention was also demonstrated by experiments carried out for the post-emergence control of mustard weed. In these experiments the compounds to be tested were formulated as aqueous emulsions and sprayed at the indicated dosage on the foliage of mustard weed plants that have attained a prescribed size. After spraying the plants were placed in a greenhouse and watered daily or more frequently. Water was not applied to the foliage of the treated plants. The severity of the injury was determined 10 to 15 days after treatment and was rated on the scale of from 0 to 10 heretofore described. The effectiveness of these compounds is demonstrated by the following data in Table IV.

TABLE IV

| Test Compound | Concentration lbs. per acre | Injury Rating |
|---|---|---|
| Product of Example 1 | 1 | 8 |
| do. | 2 | 10 |
| do. | 4 | 10 |
| Product of Example 2 | 1 | 10 |
| do. | 2 | 10 |
| do. | 4 | 10 |
| Product of Example 3 | 1 | 7 |
| do. | 2 | 9 |
| do. | 4 | 10 |
| Product of Example 6 | 1 | 7 |
| do. | 2 | 9 |
| do. | 4 | 9 |
| Product of Example 7 | 1 | 10 |
| do. | 2 | 10 |
| do. | 4 | 10 |
| Product of Example 8 | 8 | 9 |
| Product of Example 9 | 4 | 7 |
| do. | 8 | 8 |
| Product of Example 10 | 4 | 9 |
| do. | 8 | 9 |
| Product of Example 11 | 4 | 7 |
| do. | 8 | 8 |
| Product of Example 13 | 2 | 7 |
| do. | 4 | 9 |

The activity of the compounds of this invention for the post-emergence control of velvet leaf was demonstrated in experiments similar to those detailed above, wherein velvet leaf was substituted for mustard weed. The results of these experiments are presented in Table V.

TABLE V

| Test Compound | Concentration lbs. per acre | Injury Rating |
|---|---|---|
| Product of Example 2 | 2 | 8 |
| do. | 4 | 10 |
| do. | 8 | 10 |
| Product of Example 3 | 1 | 10 |
| do. | 2 | 10 |
| do. | 4 | 10 |
| Product of Example 6 | 1 | 7 |
| do. | 2 | 10 |
| do. | 4 | 10 |
| Product of Example 7 | 1 | 9 |
| do. | 2 | 9 |
| do. | 4 | 9 |
| do. | 8 | 9 |
| Product of Example 8 | 8 | 10 |
| Product of Example 9 | 4 | 8 |
| do. | 8 | 10 |
| Product of Example 10 | 2 | 7 |
| do. | 4 | 9 |
| do. | 8 | 10 |

We claim:
1. 1-(4'-methoxyphenylcarbonyloxy)-1-(3'',4''-dichlorophenyl)-3-methylurea.
2. 1-(4'-chlorophenylcarbonyloxy)-1-(3''-chlorophenyl)-3-methylurea.
3. 1-(2'-methyl-4'-chlorophenylcarbonyloxy)-1-(3'',4''-dichlorophenyl)-3-isopropylurea.
4. 1-(2'-methoxy-3',6-dichlorophenylcarbonyloxy)-1-(4''-chlorophenyl)-3-methylurea.

* * * * *